(12) United States Patent
Ramanathan et al.

(10) Patent No.: US 12,175,088 B2
(45) Date of Patent: Dec. 24, 2024

(54) HIGH ENDURANCE PERSISTENT STORAGE DEVICE

(71) Applicant: Samsung Electronics Co., Ltd., Suwon-si (KR)

(72) Inventors: Madhava Krishnan Ramanathan, Blacksburg, VA (US); Naga Sanjana Bikonda, San Jose, CA (US); Shashwat Jain, Blacksburg, VA (US); Vishwanath Maram, San Jose, CA (US)

(73) Assignee: Samsung Electronics Co., Ltd., Yongin-si (KR)

( * ) Notice: Subject to any disclaimer, the term of this patent is extended or adjusted under 35 U.S.C. 154(b) by 0 days.

(21) Appl. No.: 18/158,426

(22) Filed: Jan. 23, 2023

(65) Prior Publication Data

US 2024/0134534 A1  Apr. 25, 2024

Related U.S. Application Data

(60) Provisional application No. 63/419,293, filed on Oct. 25, 2022.

(51) Int. Cl.
*G06F 3/06* (2006.01)

(52) U.S. Cl.
CPC .......... *G06F 3/0616* (2013.01); *G06F 3/0659* (2013.01); *G06F 3/0679* (2013.01)

(58) Field of Classification Search
CPC ............. G06F 12/0246; G06F 12/0804; G06F 2212/7203; G06F 3/0659; G06F 12/0868; G06F 3/0656; G06F 3/0685; G06F 12/0897; G06F 2212/1024; G06F 2212/313; G06F 3/0679; G06F 12/0866; G06F 12/0888; G06F 12/1009; G06F 2212/1032; G06F 2212/214; G06F 2212/657; G06F 2212/7201; G06F 2212/7205; G06F 3/0604; G06F 3/061; G06F 3/0619; G06F 3/064; G06F 3/0658; G06F 3/0683; G06F 11/1441; G06F 11/1456; G06F 11/1471; G06F 12/0253; G06F 12/0292; G06F 12/0811; G06F 12/0891; G06F 12/0893; G06F 12/0895; G06F 12/122; G06F 12/123; G06F 12/126; G06F 13/16; G06F 2201/81; (Continued)

(56) References Cited

U.S. PATENT DOCUMENTS 7,010,645 B2   3/2006   Hetzler et al.
7,689,761 B2   3/2010   Yim et al.
(Continued)

OTHER PUBLICATIONS

Bjørling, M. et al., "LightNVM: The Linux Open-Channel SSD Subsystem", Proceedings of the 15th USENIX Conference on File and Storage Technologies (FAST '17), Feb. 27-Mar. 2, 2017, Santa Clara, CA, USA, pp. 359-373, USENIX Association.
(Continued)

*Primary Examiner* — Yong J Choe
(74) *Attorney, Agent, or Firm* — Lewis Roca Rothgerber Christie LLP

(57) ABSTRACT

A high endurance persistent storage device. In some embodiments, the persistent storage device includes: a controller circuit; persistent storage media, connected to the controller circuit; nonvolatile memory, connected to the controller circuit; and volatile memory, connected to the controller circuit.

19 Claims, 5 Drawing Sheets

(58) Field of Classification Search
CPC ......... G06F 2201/84; G06F 2212/1016; G06F 2212/1021; G06F 2212/1036; G06F 2212/1044; G06F 2212/1048; G06F 2212/224; G06F 2212/284; G06F 2212/311; G06F 2212/312; G06F 2212/466; G06F 2212/7208; G06F 3/0608; G06F 3/0611; G06F 3/0641; G06F 3/0688

See application file for complete search history.

(56) References Cited

U.S. PATENT DOCUMENTS

| | | | |
|---|---|---|---|
| 8,407,403 | B2 | 3/2013 | Prabhakaran et al. |
| 8,924,663 | B2 | 12/2014 | Szczepkowski et al. |
| 9,384,123 | B2 | 7/2016 | Hida et al. |
| 9,507,722 | B2 | 11/2016 | Desai et al. |
| 10,359,954 | B2 | 7/2019 | Zhou et al. |
| 11,175,853 | B2 | 11/2021 | Chang et al. |
| 11,182,285 | B2 | 11/2021 | Choi |
| 11,204,869 | B2 | 12/2021 | Li |
| 11,301,369 | B2 | 4/2022 | Gholamipour et al. |
| 2009/0300280 | A1* | 12/2009 | Jutzi ............... G06F 12/0888 711/E12.019 |
| 2018/0260136 | A1 | 9/2018 | Huo et al. |
| 2019/0065121 | A1 | 2/2019 | Malina et al. |
| 2019/0243756 | A1 | 8/2019 | Ray et al. |
| 2020/0310684 | A1* | 10/2020 | Fowler ............ G06F 3/0659 |
| 2020/0363997 | A1 | 11/2020 | Li et al. |
| 2023/0070397 | A1* | 3/2023 | Esaka ............. G06F 3/0619 |

OTHER PUBLICATIONS

Boboila, S. et al., "Write Endurance in Flash Drives: Measurements and Analysis", Proceedings of the 8th USENIX Conference on File and Storage Technologies (FAST '10), 2010, pp. 115-128, USENIX Association.

Lee, D. et al., "Improving Write Performance Through Reliable Asynchronous Operation in Physically-Addressable SSD", Oct. 26, 2020, pp. 195528-195540, vol. 8, IEEE Access.

Shin, I., "Light Weight Sector Mapping Scheme for NAND-based Block Devices", IEEE Transactions on Consumer Electronics, May 2010, pp. 651-656, vol. 56, No. 2, IEEE.

EPO Extended European Search Report dated Mar. 19, 2024, issued European Patent Application No. 23205169.8 (11 pages).

* cited by examiner

HIGH ENDURANCE PERSISTENT STORAGE DEVICE

CROSS-REFERENCE TO RELATED APPLICATION(S)

The present application claims priority to and the benefit of U.S. Provisional Application No. 63/419,293, filed Oct. 25, 2022, entitled "ARCHITECTURE FOR PRESERVING ENDURANCE AND IMPROVING SSDS LIFESPAN", the entire content of which is incorporated herein by reference.

FIELD

One or more aspects of embodiments according to the present disclosure relate to storage devices, and more particularly to a high endurance persistent storage device.

BACKGROUND

Persistent storage devices employing flash memory (e.g., not-AND (NAND) flash memory) may perform read and write operations with page granularity and erase operations with block granularity, which may be significantly coarser. This difference in granularity may lead to write amplification, for example, in a garbage collection operation in which valid data remaining in a block are moved to another block before the block is erased so that it may be reused. The cells of flash memory may have limited endurance, e.g., they may degrade gradually with repeated erase and write cycles.

It is with respect to this general technical environment that aspects of the present disclosure are related.

SUMMARY

According to an embodiment of the present disclosure, there is provided a system including: a persistent storage device, the persistent storage device including: a controller circuit; persistent storage media, connected to the controller circuit; nonvolatile memory, connected to the controller circuit; and volatile memory, connected to the controller circuit.

In some embodiments, the persistent storage media is flash memory.

In some embodiments, the volatile memory is dynamic random access memory.

In some embodiments, the nonvolatile memory is storage class memory.

In some embodiments, the controller circuit is configured to perform a method, the method including: receiving a first write request, for a first page of the persistent storage media; storing the first write request in the nonvolatile memory; receiving a second write request, for the first page of the persistent storage media; storing the second write request in the nonvolatile memory; and flushing the first write request and the second write request to the first page of the persistent storage media.

In some embodiments, the controller circuit is further configured to store logging information in the nonvolatile memory.

In some embodiments, the controller circuit is further configured to store metadata in the nonvolatile memory.

In some embodiments, the controller circuit is further configured to store journaling information in the nonvolatile memory.

In some embodiments, the system further includes an accelerator circuit, connected to the volatile memory. In some embodiments, the accelerator circuit is configured to identify a frequently accessed page in the persistent storage media.

In some embodiments, the accelerator circuit is further configured to cause the frequently accessed page to be moved to the nonvolatile memory.

According to an embodiment of the present disclosure, there is provided a method, including: receiving, by a persistent storage device, a first write request, for a first page of persistent storage media of the persistent storage device; storing the first write request in a nonvolatile memory of the persistent storage device; receiving a second write request, for the first page of the persistent storage media; storing the second write request in the nonvolatile memory; and flushing the first write request and the second write request to the first page of the persistent storage media.

In some embodiments, the nonvolatile memory is storage class memory.

In some embodiments, the method further includes storing logging information in the nonvolatile memory.

In some embodiments, the method further includes storing metadata in the nonvolatile memory.

In some embodiments, the method further includes storing journaling information in the nonvolatile memory.

In some embodiments, the persistent storage device includes an accelerator circuit, and a volatile memory connected to the accelerator circuit.

In some embodiments, the accelerator circuit is configured to identify a frequently accessed page in the persistent storage media.

In some embodiments, the accelerator circuit is further configured to cause the frequently accessed page to be moved to the nonvolatile memory.

According to an embodiment of the present disclosure, there is provided a system including: a persistent storage device, the persistent storage device including: means for processing; means for persistent storage, connected to the means for processing; nonvolatile memory, connected to the means for processing; and volatile memory, connected to the means for processing.

BRIEF DESCRIPTION OF THE DRAWINGS

These and other features and advantages of the present disclosure will be appreciated and understood with reference to the specification, claims, and appended drawings wherein:

DETAILED DESCRIPTION

Figure 1:
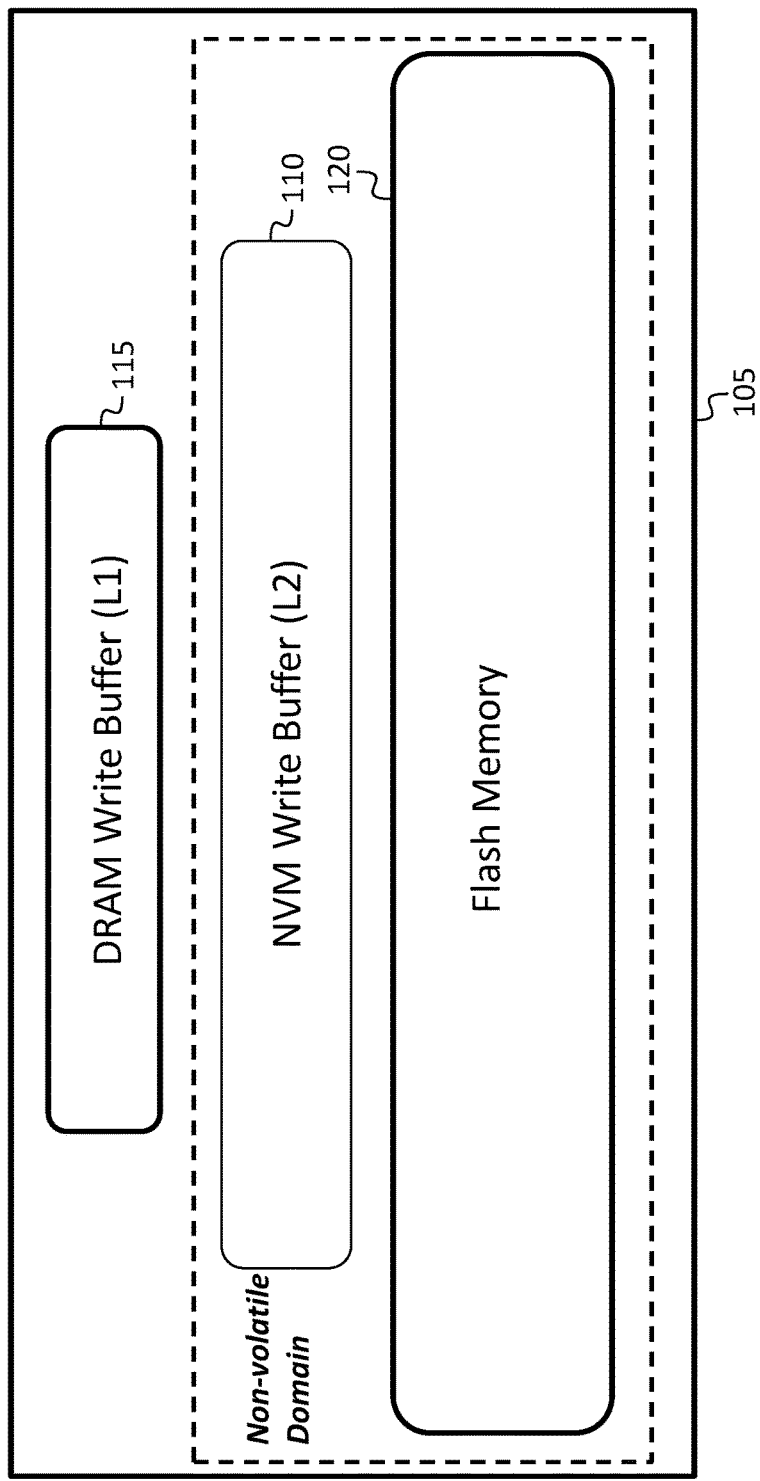
FIG. 1 is a block diagram of a portion of a persistent storage device, according to an embodiment of the present disclosure.

The detailed description set forth below in connection with the appended drawings is intended as a description of exemplary embodiments of a high endurance persistent storage device provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Some embodiments address write amplification and wear acceleration in persistent storage devices, e.g., in Nonvolatile Memory Express (NVMe) solid-state drives (SSDs). Features of such embodiments may have the effect of improving the SSD lifetime (long-term data endurance (LDE)) and reducing the total cost of ownership. Features of such embodiments may also improve the performance of computational storage (e.g., SmartSSDs) by leveraging machine learning (ML)-based hot block and hot page caching on a high-speed non-volatile memory (e.g., phase change memory (PCM)).

The write amplification factor (WAF) and wear acceleration index (WAI) of a persistent storage device may be relevant for the endurance and lifetime of the persistent storage device. Reducing the write amplification factor and the wear acceleration index may have a positive impact on the lifespan of the persistent storage device, which may be inversely correlated with the storage deployment cost of the persistent storage device.

For example, in some solid-state drives, updates to the same pages and blocks may be done out-of-place (e.g., because of the coarse erase granularity of some flash memory media) which may cause a significant increase in the write amplification factor. Moreover, each write to the flash memory of a solid-state drive may include additional journaling and wear leveling metadata overhead, which may also contribute to an increase in the wear acceleration index.

A solid-state drive may include a volatile memory (e.g., dynamic random access memory (DRAM)) buffer, which may be used to store, e.g., data to be written to the flash memory, and which may in some circumstances (e.g., if a data value to be written is overwritten by a new value while it is still in the buffer) make it possible to avoid some write operations to the flash memory. The buffer may however be flushed to the flash memory relatively frequently to avoid the risk of unacceptable data loss in the event of a power failure; this may limit the effectiveness of the volatile memory buffer for avoiding write operations to the flash memory.

As such, in some embodiments, a high-speed non-volatile memory (NVM) (e.g., storage class memory (SCM), which may be phase change memory (PCM) or non-volatile random access memory (RAM), for example) may be employed as an additional write buffer located between the volatile memory buffer and the flash memory, to reduce the wear acceleration index and the write amplification factor. As used herein, "storage class memory" means memory that is inherently nonvolatile (e.g., that does not require a power-supply connection or a battery-backup to retain data), and that has a read latency of less than 1 microsecond, and a write latency of less than 1 microsecond.

FIG. 1 shows an architecture of a persistent storage device 105, in some embodiments. The persistent storage device includes a high-speed non-volatile memory buffer 110 as an additional write buffer between the volatile memory (e.g., DRAM) write buffer 115 and the flash memory 120. In addition to user data, the persistent storage device 105 may store logging blocks and metadata blocks, which are information for use in executing the garbage collection and wear levelling operations. These logging blocks and metadata blocks may not only cause additional writes, but also may be updated more frequently and hence such blocks (if stored in the flash memory 120) may wear out faster than user data blocks. Logging information may include, for example self-monitoring, analysis and reporting technology (SMART) information (which may, for example, be recorded pursuant to the NVMe standard) that monitors errors, device health, and endurance. Metadata may include, for example, an erase count, a free block count, or file data itself (e.g., a file name, a date, a time, a description of the file's contents, or superblock information). A controller 415 (or control circuit, which may be or include a processing circuit) (FIG. 4) may control various aspects of the persistent storage device 105 including interactions with the host, and data transfers between the volatile memory buffer 115, the high-speed non-volatile memory buffer 110, and the flash memory 120.

The inclusion of the high-speed non-volatile memory buffer 110 as an additional write buffer may make it possible to batch multiple updates (to the same block or pages) and to write them to the flash memory 120 in one out-of-place update. Further, the metadata and log information may be decoupled from the flash memory 120 and stored entirely in the high-speed non-volatile memory buffer 110. A mapping between the metadata and log information and the corresponding data blocks may then be maintained. Thus the more frequently updated metadata and log information writes may be absorbed in the high endurance high-speed non-volatile memory buffer 110, saving space in the flash memory 120 and avoiding wear in the flash memory 120.

The high-speed non-volatile memory buffer 110, in additional to being non-volatile (i.e., once data is stored in the high-speed non-volatile memory buffer 110 it can persist across power cycles), also may have high (e.g., nearly infinite) write endurance compared to the flash memory 120. Therefore if a larger number of writes is batched in the high-speed non-volatile memory buffer 110, then the number of writes to flash may be significantly reduced, which may directly reduce the write amplification factor and wear acceleration index. Moreover, if there is a crash (e.g., a power outage or a crash of the controller of the persistent storage device 105) before the flash memory 120 is updated, the data in the high-speed non-volatile memory buffer 110 may still be retrieved. Similarly, storing the wear leveling (WL) metadata and log information in the high-speed non-volatile memory buffer 110 may make it possible to retrieve this data even in the event of a power loss or crash. The mapping table (which maps logical to physical blocks), which in some circumstances may be stored in the volatile memory buffer 115, may, in some embodiments, also be stored instead in the high-speed non-volatile memory buffer 110; this may significantly reduce the bootstrapping time, as the mapping table, in such an embodiment, does not need to be reconstructed at every startup. Further, the high-speed non-volatile memory buffer 110 may be constructed to have a large capacity (e.g., larger than the volatile memory buffer 115) and it may therefore be capable of hosting the data for a longer time, thereby increasing the likelihood that it will be possible to batch write operations.

In some embodiments, updates of the metadata, of the log information, and of the journaling information during garbage collection and wear levelling operations may be performed on the high-speed non-volatile memory buffer 110, which may have up to 50 times lower write latency than the flash memory 120. This may improve the latency and performance of the garbage collection and wear leveling processes, potentially resulting in significant performance improvements if during garbage collection the persistent storage device 105 cannot serve user requests (e.g., requests from a host connected to (or containing) the persistent storage device 105).

The architecture of FIG. 1 may be extended to a computational storage device (e.g., a SmartSSD) to provide intelligent machine learning based caching solutions, and to improve the performance and throughput of the computational storage device. In such an embodiment, the on-device accelerator may be used to gather data access statistics and to identify access patterns, so as to classify hot (frequently accessed) pages, hot blocks, and hot data. Further, the identified hot pages, hot blocks, and hot data may then be moved to the on-device high-speed non-volatile memory buffer 110 and any subsequent request to the hot data may be served from the high-speed non-volatile memory buffer 110, thereby eliminating the need to fetch such data from the flash memory 120. This may improve both the throughput and latency of the computational storage device.

Figure 2:
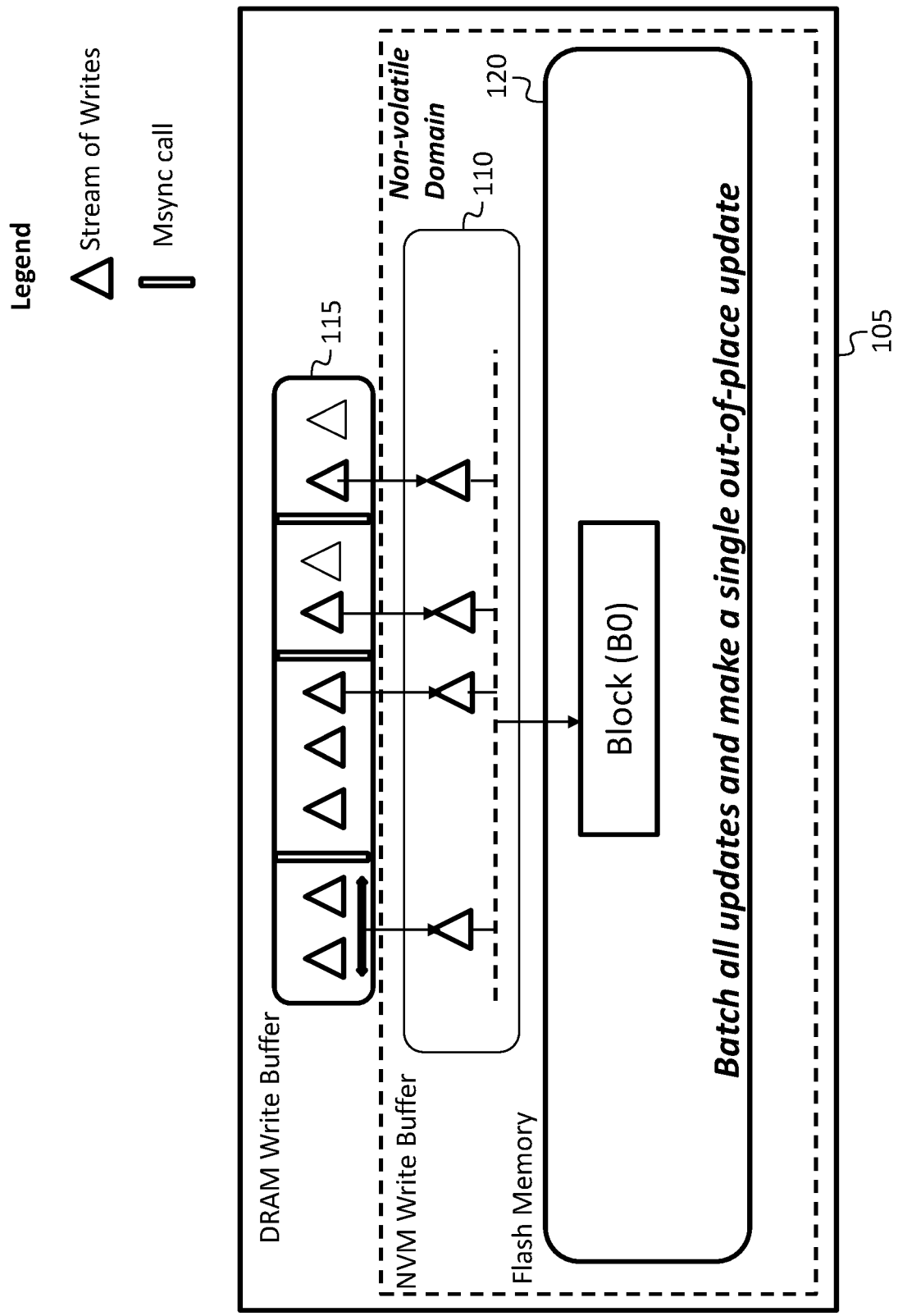
FIG. 2 is a block diagram of a portion of a persistent storage device, according to an embodiment of the present disclosure.

Write amplification factor in a solid-state drive is defined as the ratio of data written to the flash memory to the data written in response to write requests from the host. That is, any additional data (over the user data) written to the flash memory 120 increases the write amplification factor. FIG. 2 below presents an architecture for reducing the write amplification factor by using (as in the embodiment of FIG. 1) an additional high-speed non-volatile memory buffer 110 between the volatile memory buffer 115 and the flash memory 120.

The use of the high-speed non-volatile memory buffer 110 as an intermediate tier may make it possible to batch a larger number of write operations (each corresponding to a write request (e.g., a write request received from the host)) before writing to the flash memory, and to then flush the corresponding write requests to the flash memory 120 in a batch. In an embodiment without the high-speed non-volatile memory buffer 110, the flash memory 120 may be updated whenever the volatile memory buffer 115 becomes full or when the application (running on the host) issues a flush operation (e.g., a call to msync( ) or fsync( )); even if the write buffer is not full it may be necessary to update the flash memory 120 to ensure crash consistency for the user data. In the architecture of FIG. 2, however, the write operations may simply be written to the high-speed non-volatile memory buffer 110, and, because the high-speed non-volatile memory buffer 110 is nonvolatile, be permitted to reside there until the high-speed non-volatile memory buffer 110 is full; this may increase the likelihood that opportunities for write batching will be present. As the high-speed non-volatile memory buffer 110 becomes full, all updates to a block or page may be batched and written to the flash memory 120 as a single update. The legend of FIG. 2 shows the symbols (i) for write operations (triangles) and (ii) for commands from the host (e.g., calls to msync( ) to flush the volatile memory buffer 115. It may be seen that by avoiding the need to flush data to the flash memory 120 with every flush command, it is possible to accumulate a significantly larger number of write commands between write operations to the flash memory 120, providing significantly greater opportunities to perform batching when writing to the flash memory 120.

Such batching may be advantageous because each write to the flash memory 120 may use an out-of-place update, i.e., a new page or block may be used to make updates to the existing page. This not only increases the write latency but also increases the garbage collection and wear leveling overhead, as writing to a new block may involve erase and rewrite operations. As such, the greater the extent to which batching is employed, the fewer flash memory 120 updates may be used, reducing garbage collection and wear leveling overhead. This may increase the lifespan of the persistent storage device 105 and reduce the total cost of ownership of the persistent storage device 105.

Figure 3:
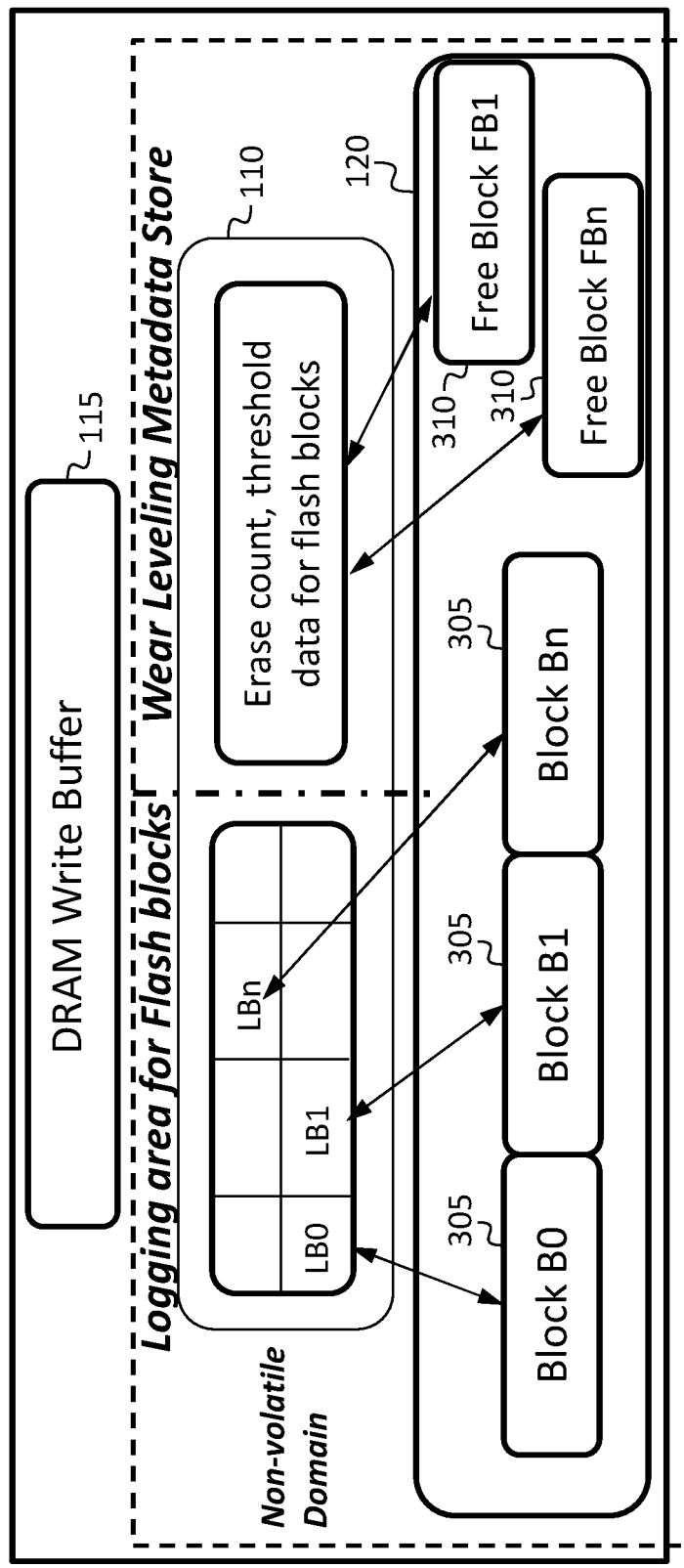
FIG. 3 is a block diagram of a portion of a persistent storage device, according to an embodiment of the present disclosure.

In a persistent storage device 105, the write amplification factor may be related not only to the writing of user data but also to some of the internal operations of the persistent storage device 105, such as wear levelling, journaling, and garbage collection. The metadata and logging (for wear levelling and normal write operations to the flash memory 120) may cause more significant wear of the flash memory 120 than writing to the user data blocks because such metadata and log blocks may be more frequently updated. As such, it may be possible to further reduce wear of the flash memory 120 by (in addition to performing batching, as described above) leveraging the high-speed non-volatile memory buffer 110 to decouple such metadata from the flash memory 120. FIG. 3 shows such an embodiment.

As shown in FIG. 3, in some embodiments, a portion of the high-speed non-volatile memory buffer 110 is reserved for storing the logging data (for each block 305) and the wear-levelling metadata, which may be used to store metadata for free blocks 310. To associate the metadata and logging data in the high-speed non-volatile memory buffer 110 with the corresponding block in the flash memory 120, a two-way mapping may be maintained. Thus, the metadata may be updated in the high-speed non-volatile memory buffer 110 rather than incurring write operations to the flash memory 120. Because the high-speed non-volatile memory buffer 110 is non-volatile, these metadata and log data may be consistently retrieved across power cycles. Further, the high-speed non-volatile memory buffer 110 may allow fine-grained updates (e.g., 64 byte updates, 256 byte updates, or 512 byte updates) so this may further reduce any potential write amplification.

Figure 4:
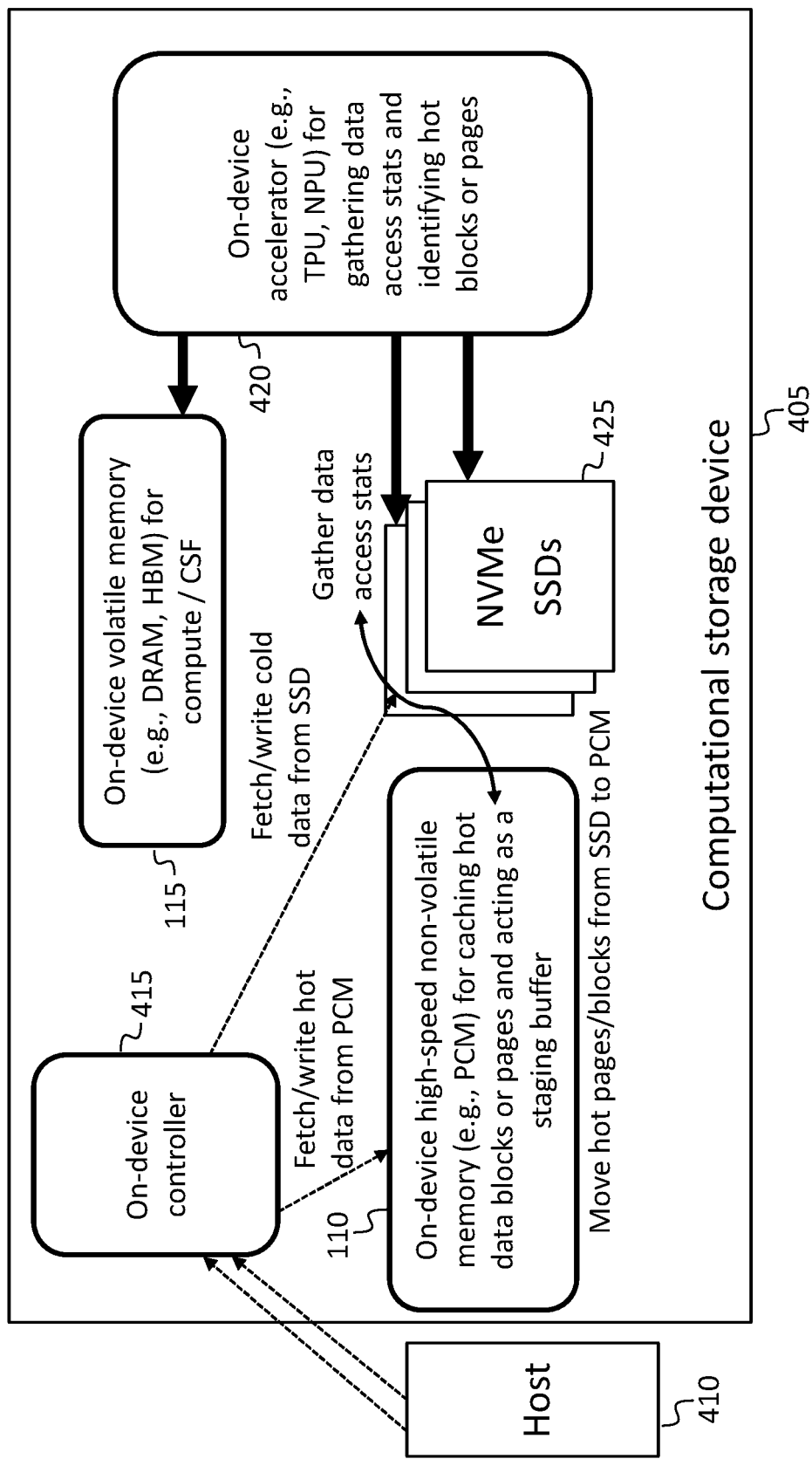
FIG. 4 is a block diagram of a portion of a computational storage device, according to an embodiment of the present disclosure.

As illustrated in FIG. 4, the features of embodiments discussed above may be employed in an analogous manner in a computational storage device, with the potential additional benefit that to the extent that the replacement cost of a computational storage device exceeds the replacement cost of a persistent storage device 105, the benefits of prolonging the life of the device (by reducing wear on the flash memory 120) may be greater for a computational storage device than for a persistent storage device 105. In addition to improving the lifespan, a high-speed non-volatile memory buffer 110 may be used in a computational storage device to provide a rich caching solution. FIG. 4 shows an embodiment in which a high-speed non-volatile memory buffer 110 is used as a caching layer and a write-staging buffer. The computational storage device 405 is connected to a host 410. In addition to the high-speed non-volatile memory buffer 110, the computational storage device 405 includes a controller (or controller circuit) 415 (which may be or include a processing circuit), a volatile memory buffer 115 (which may be used for computations or computational storage functions (CSF)), a dedicated on-device accelerator (or accelerator circuit) 420 (which may be or include a processing circuit), and one or more solid-state drives 425.

The on-device accelerator 420 may be or include a processing circuit such as a tensor processing unit (TPU) or a neural processing unit (NPU), and it may be used for gathering data access statistics and identifying hot blocks or pages. The on-device accelerator 420 may be used to run machine learning (ML) algorithms to detect the host applications' data access patterns and predict hot blocks, pages, or data by leveraging its training data. The identified hot data may be moved from the solid-state drives to the high-speed non-volatile memory buffer 110 by the controller 415, and subsequent requests to access the hot data may be served from the high-speed non-volatile memory buffer 110 without a need to access the solid-state drives 425. In some embodiments the on-device accelerator 420 may cause frequently accessed data to be moved, by the controller 415, to the high-speed non-volatile memory buffer 110 (e.g., the accelerator 420 may send, to the controller 415 a report identifying such frequently accessed data, or the accelerator 420 may send, to the controller 415 a request that such frequently accessed data be moved to the high-speed non-volatile memory buffer 110). This may significantly improve the latency and performance of the computational storage device 405.

A caching algorithm (e.g., least recently used (LRU), least frequently used (LFU)) may be used to handle the eviction and migration of blocks, data, or pages from the solid-state drives 425 to the high-speed non-volatile memory buffer 110 and vice versa. Further, the high-speed non-volatile memory buffer 110 may also be used as a staging buffer for write operations. For example, all of the write requests received from an application may initially be written to the high-speed non-volatile memory buffer 110, and the computational storage device 405 may then batch the updates where possible and issue a single write request to flush the batch of write requests to the target solid-state drive 425. Because the high-speed non-volatile memory buffer 110 has lower write latency than the solid-state drives 425 this may significantly improve the write performance while also supporting write batching external to the solid-state drives 425. If an application performs a skewed access, the cache hit rate may be increased because of the use of the high-speed non-volatile memory buffer 110 as a staging buffer for write operations. Because the high-speed non-volatile memory buffer 110 is non-volatile, writes may be consistently retrieved in the event of an unexpected crash.

Figure 5:
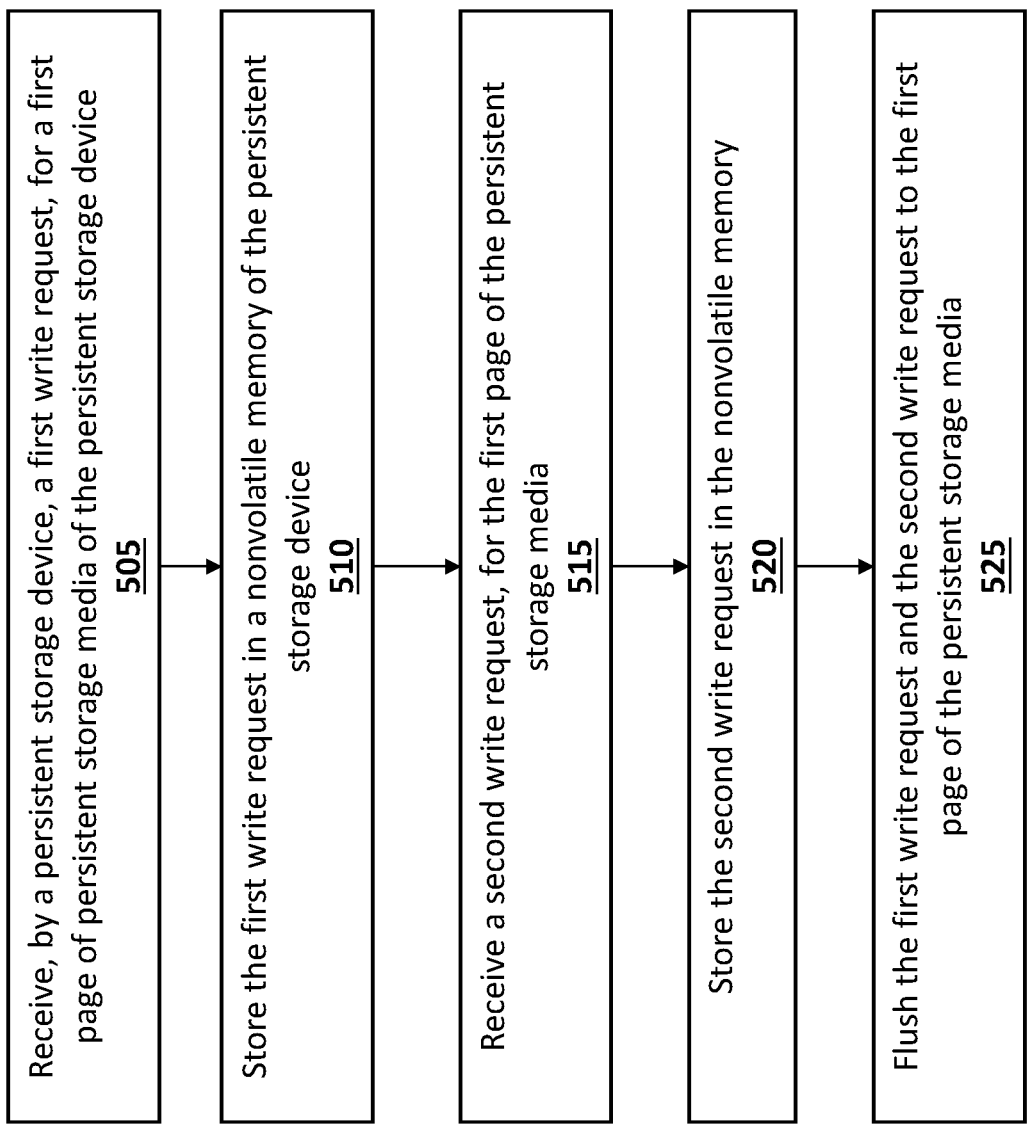
FIG. 5 is a flowchart, according to an embodiment of the present disclosure.

FIG. 5 illustrates a method, in some embodiments. The method includes receiving, at 505, by a persistent storage device, a first write request, for a first page of persistent storage media of the persistent storage device; storing, at 510, the first write request in a nonvolatile memory of the persistent storage device; receiving, at 515, a second write request, for the first page of the persistent storage media; storing, at 520, the second write request in the nonvolatile memory; and flushing, at 525, the first write request and the second write request to the first page of the persistent storage media.

The persistent storage devices 105 and computational storage device 405 discussed herein may have any of various suitable form factors, including U.2, U.3, E1.S, E3.S, E3.L, E1.L, M.2, and AIC. As used herein, "storing" a write request means storing at least the data associated with the write request.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "or" should be interpreted as "and/or", such that, for example, "A or B" means any one of "A" or "B" or "A and B".

The background provided in the Background section of the present disclosure section is included only to set context, and the content of this section is not admitted to be prior art. Any of the components or any combination of the components described (e.g., in any system diagrams included herein) may be used to perform one or more of the operations of any flow chart included herein. Further, (i) the operations are example operations, and may involve various additional steps not explicitly covered, and (ii) the temporal order of the operations may be varied.

Each of the terms "processing circuit" and "means for processing" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general-purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example, a processing circuit may include two processing circuits, an FPGA and a CPU, interconnected on a PCB.

As used herein, when a method (e.g., an adjustment) or a first quantity (e.g., a first variable) is referred to as being "based on" a second quantity (e.g., a second variable) it means that the second quantity is an input to the method or influences the first quantity, e.g., the second quantity may be an input (e.g., the only input, or one of several inputs) to a function that calculates the first quantity, or the first quantity may be equal to the second quantity, or the first quantity may be the same as (e.g., stored at the same location or locations in memory as) the second quantity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Similarly, a range described as "within 35% of 10" is intended to include all subranges between (and including) the recited minimum value of 6.5 (i.e., (1−35/100) times 10) and the recited maximum value of 13.5 (i.e., (1+35/100) times 10), that is, having a minimum value equal to or greater than 6.5 and a maximum value equal to or less than 13.5, such as, for example, 7.4 to 10.6. Any maximum numerical limitation recited herein is intended to include all lower numerical limitations subsumed therein and any minimum numerical limitation recited in this specification is intended to include all higher numerical limitations subsumed therein.

It will be understood that when an element is referred to as being "immediately connected" or "immediately coupled" to another element, there are no intervening elements present. As used herein, "connected" means connected by a signal path (e.g., a conductor or a waveguide) that may contain arbitrary intervening elements, including intervening elements the presence of which qualitatively changes the behavior of the circuit. As used herein, "directly connected" means (i) "immediately connected" or (ii) connected with intervening elements, the intervening elements being ones (e.g., low-value resistors or inductors, short sections of transmission line, or short sections of waveguide) that do not qualitatively affect the behavior of the circuit. Any pair of elements shown in the drawings with a line connecting the elements may be (i) connected, in some embodiments, (ii) directly connected, in some embodiments, or (iii) immediately connected, in some embodiments.

Some embodiments may include features of the following numbered statements.

1. A system comprising:
    a persistent storage device, the persistent storage device comprising:
        a controller circuit;
        persistent storage media, connected to the controller circuit;
        nonvolatile memory, connected to the controller circuit; and
        volatile memory, connected to the controller circuit.
2. The system of statement 1, wherein the persistent storage media is flash memory.
3. The system of statement 1 or statement 2, wherein the volatile memory is dynamic random access memory.
4. The system of any one of the preceding statements, wherein the nonvolatile memory is storage class memory.
5. The system of any one of the preceding statements, wherein the controller circuit is configured to perform a method, the method comprising:
    receiving a first write request, for a first page of the persistent storage media;
    storing the first write request in the nonvolatile memory;
    receiving a second write request, for the first page of the persistent storage media;
    storing the second write request in the nonvolatile memory; and
    flushing the first write request and the second write request to the first page of the persistent storage media.
6. The system of statement 5, wherein the controller circuit is further configured to store logging information in the nonvolatile memory.
7. The system of statement 5 or statement 6, wherein the controller circuit is further configured to store metadata in the nonvolatile memory.
8. The system of any one of statements 5 to 7, wherein the controller circuit is further configured to store journaling information in the nonvolatile memory.
9. The system of any one of the preceding statements, further comprising an accelerator circuit, connected to the volatile memory.
10. The system of statement 9, wherein the accelerator circuit is configured to identify a frequently accessed page in the persistent storage media.
11. The system of statement 9 or statement 10, wherein the accelerator circuit is further configured to cause the frequently accessed page to be moved to the nonvolatile memory.
12. A method, comprising:
    receiving, by a persistent storage device, a first write request, for a first page of persistent storage media of the persistent storage device;
    storing the first write request in a nonvolatile memory of the persistent storage device;
    receiving a second write request, for the first page of the persistent storage media;
    storing the second write request in the nonvolatile memory; and
    flushing the first write request and the second write request to the first page of the persistent storage media.
13. The method of statement 12, wherein the nonvolatile memory is storage class memory.
14. The method of statement 12 or statement 13, further comprising storing logging information in the nonvolatile memory.
15. The method of any one of statements 12 to 14, further comprising storing metadata in the nonvolatile memory.
16. The method of any one of statements 12 to 15, further comprising storing journaling information in the nonvolatile memory.
17. The method of any one of statements 12 to 16, wherein the persistent storage device comprises an accelerator circuit, and a volatile memory connected to the accelerator circuit.
18. The method of statement 17, wherein the accelerator circuit is configured to identify a frequently accessed page in the persistent storage media.

19. The method of statement 17 or statement 18, wherein the accelerator circuit is further configured to cause the frequently accessed page to be moved to the nonvolatile memory.

20. A system comprising:
a persistent storage device, the persistent storage device comprising:
means for processing;
means for persistent storage, connected to the means for processing;
nonvolatile memory, connected to the means for processing; and
volatile memory, connected to the means for processing.

Although exemplary embodiments of a high endurance persistent storage device have been specifically described and illustrated herein, many modifications and variations will be apparent to those skilled in the art. Accordingly, it is to be understood that a high endurance persistent storage device constructed according to principles of this disclosure may be embodied other than as specifically described herein. The invention is also defined in the following claims, and equivalents thereof.

What is claimed is:

1. A system comprising:
a solid-state drive, the solid-state drive comprising:
a controller circuit;
persistent storage media, connected to the controller circuit;
nonvolatile memory, connected to the controller circuit; and
volatile memory, connected to the controller circuit,
wherein the controller circuit is configured to:
receive a first write request, for a first page of the persistent storage media;
store the first write request in the nonvolatile memory;
receive a second write request, for the first page of the persistent storage media;
store the second write request in the nonvolatile memory; and
flush the first write request and the second write request to the first page of the persistent storage media.

2. The system of claim 1, wherein the persistent storage media is flash memory.

3. The system of claim 2, wherein the volatile memory is dynamic random access memory.

4. The system of claim 3, wherein the nonvolatile memory is storage class memory.

5. The system of claim 1, wherein the controller circuit is further configured to store logging information in the nonvolatile memory.

6. The system of claim 1, wherein the controller circuit is further configured to store metadata in the nonvolatile memory.

7. The system of claim 1, wherein the controller circuit is further configured to store journaling information in the nonvolatile memory.

8. The system of claim 1, further comprising an accelerator circuit, connected to the volatile memory.

9. The system of claim 8, wherein the accelerator circuit is configured to identify a frequently accessed page in the persistent storage media.

10. The system of claim 9, wherein the accelerator circuit is further configured to cause the frequently accessed page to be moved to the nonvolatile memory.

11. A method, comprising:
receiving, by a persistent storage device, a first write request, for a first page of persistent storage media of the persistent storage device;
storing, by the persistent storage device, the first write request in a nonvolatile memory of the persistent storage device;
receiving a second write request, for the first page of the persistent storage media;
storing the second write request in the nonvolatile memory; and
flushing the first write request and the second write request to the first page of the persistent storage media.

12. The method of claim 11, wherein the nonvolatile memory is storage class memory.

13. The method of claim 11, further comprising storing logging information in the nonvolatile memory.

14. The method of claim 13, further comprising storing metadata in the nonvolatile memory.

15. The method of claim 14, further comprising storing journaling information in the nonvolatile memory.

16. The method of claim 11, wherein the persistent storage device comprises an accelerator circuit, and a volatile memory connected to the accelerator circuit.

17. The method of claim 16, wherein the accelerator circuit is configured to identify a frequently accessed page in the persistent storage media.

18. The method of claim 17, wherein the accelerator circuit is further configured to cause the frequently accessed page to be moved to the nonvolatile memory.

19. A system comprising:
a solid-state drive, the solid-state drive comprising:
means for processing;
means for persistent storage, connected to the means for processing;
nonvolatile memory, connected to the means for processing; and
volatile memory, connected to the means for processing
wherein the means for processing is configured to:
receive a first write request, for a first page of the means for persistent storage;
store the first write request in the nonvolatile memory;
receive a second write request, for the first page of the means for persistent storage;
store the second write request in the nonvolatile memory; and
flush the first write request and the second write request to the first page of the means for persistent storage.

* * * * *